United States Patent Office 3,182,087
Patented May 4, 1965

3,182,087
PROCESS FOR THE PREPARATION OF TRIMETHYLHYDRAZINE
David Horvitz, Cincinnati, Ohio, assignor, by mesne assignments, to FMC Corporation, New York, N.Y., a corporation of Delaware
No Drawing. Filed Aug. 7, 1958, Ser. No. 753,613
6 Claims. (Cl. 260—583)

This invention relates to a novel process for the preparation of trimethylhydrazine. More particularly, the invention pertains to a method wherein trimethylhydrazine is obtained by the catalytic hydrogenation of methylenedimethylhydrazine.

Trimethylhydrazine is useful as a rocket fuel either alone as a monopropellant or in combination with oxidizers commonly used in rocket propulsion. The compound is hypergolic with nitric acid and therefore offers additional advantages. Trimethylhydrazine also has application as an organic base, as a strong reducing agent in aqueous or organic media, and as an intermediate in the production of various chemicals.

Heretofore, trimethylhydrazine has been prepared by reducing methylenedimethylhydrazine with lithium aluminum hydride, a chemical reducing agent. Lithium aluminum hydride was employed in this prior art process because of the susceptibility of methylenedimethylhydrazine to polymerization and hydrolysis. Furthermore, hydrazine compounds are known to be easily cleaved at the nitrogen to nitrogen bond by hydrogen in the presence of catalysts. The use of a chemical reducing agent such as lithium aluminum hydride has, however, numerous disadvantages. For one thing, lithium aluminum hydride is an extremely expensive material and, in addition, requires special handling due to its sensitivity to air and moisture. Consequently, the use of this material is not practical for the economic production of trimethylhydrazine on a commercial scale.

One object of this invention is to provide a process for the preparation of trimethylhydrazine which avoids the disadvantages of the prior art process. Another object of the invention is to provide a catalytic process for the preparation of trimethylhydrazine from methylenedimethylhydrazine which is useful and readily adaptable to commercial operations. Other objects will become apparent from the ensuing description of the invention.

In accordance with the present invention, these objects are accomplished by reacting methylenedimethylhydrazine with hydrogen in the presence of a Group VIII metal catalyst. Particularly effective metal catalysts for this purpose are palladium, platinum and nickel. The use of palladium is especially preferred. The metal catalysts may be employed as such or may be supported on conventional inert materials such as carbon, charcoal, barium sulfate, alumina, silica gel and the like. The amount of catalyst employed may vary depending upon the particular Group VIII metal catalyst used. The preferred concentration of catalyst will range from about 0.05 to 10 percent by weight of the methylenedimethylhydrazine.

In general, the process of the invention is carried out at elevated pressures, although the reduction reaction will proceed at atmospheric pressure at a slower rate. It is preferred, however, to operate at pressures in the range of about 40 to 4000 p.s.i., particularly at about 300 to 3000 p.s.i., though higher pressures are not deleterious. The temperature used in the reaction may vary from about 0° to about 100° C., preferably about 10° to 60° C. The time required for the catalytic reduction reaction will vary from about 1 to 24 hours depending upon the temperatures and pressures employed. A solvent or a reaction medium such as water, alcohol or other inert organic compounds may be used, but its use is not essential.

The invention will be more fully understood by reference to the following illustrative embodiments:

*Example I*

*Run A.*—20 mls. of methylenedimethylhydrazine dissolved in 80 mls. of water were placed in a pressure vessel along with 1 gram of 10% palladium on carbon (0.1 gram of palladium). The resulting mixture was agitated under 300 p.s.i. of hydrogen gas. The theoretical amount of hydrogen (440 lbs.) was absorbed in 4.5 hours. The solution was filtered free of the metal catalysts and then refluxed with cyclohexanone to remove any unreacted methylenedimethylhydrazine or unsymmetrical-dimethylhydrazine which may have been formed. The remaining aqueous solution, after extraction with ether, was treated with solid sodium hydroxide to permit easy isolation of the trimethylhydrazine by fractional distillation. The trimethylhydrazine obtained by distillation was equal to a yield of 60%. The compound had a boiling point of about 60° C. (literature boiling point: 58.8°–60.1° C.). The trimethylhydrazine product was also identified by its titer with acid and potassium iodate, and the melting point of its picrate derivative.

*Run B.*—20 mls. of methylenedimethylhydrazine were placed in a pressure vessel together with 1.5 grams of 10% palladium on charcoal catalyst (0.15 gram of palladium). The reaction mixture was shaken with hydrogen at 2000 p.s.i. for 2 hours at 48° C. and for 2.5 hours at 65° C. Trimethylhydrazine was recovered from the resulting reaction product mixture.

*Example II*

*Run A.*—10 mls. of methylenedimethylhydrazine were placed in a pressure vessel with 2 grams of Raney nickel (wet with water) and shaken under 3000 p.s.i. of hydrogen for 2.5 hours. A high yield of trimethylhydrazine was recovered by fractionation of the reaction product mixture after removal of the metal catalyst therefrom.

*Run B.*—Using the same conditions employed in Run A, with exception that the Raney nickel was prewashed with methylenedimethylhydrazine to remove the water, resulted in the recovery of a good yield of trimethylhydrazine from the reaction product mixture.

*Run C.*—25 mls. of methylenedimethylhydrazine were shaken with 4.5 grams of Raney nickel in a pressure vessel under 1700 p.s.i. of hydrogen and at a temperature of about 50° C. for a period of 1.75 hours. A good yield of trimethylhydrazine was recovered by fractionation from the reaction product mixture.

*Example III*

10 mls. of methylenedimethylhydrazine were shaken with agitation with 0.1 gram of platinum oxide (Adam's catalyst) under 3000 p.s.i. for 2.5 hours. Trimethylhydrazine was recovered from the reaction product mixture.

While certain particular embodiments are illustrated by the above examples it will be understood that the process is obviously subject to variations and modifications without departing from its broader aspects. Thus, for example, it is obvious that various separation methods may be employed in recovering the trimethylhydrazine from the reaction product mixture.

What is claimed is:

1. A process for the preparation of trimethylhydrazine which consists essentially of reacting methylenedimethylhydrazine with hydrogen at a temperature between about 0° and 100° C. in the presence of a metal catalyst selected from the group consisting of palladium, nickel, and platinum, and recovering trimethylhydrazine from the resulting reaction product mixture.

2. The process of claim 1 wherein said reaction is carried out at a pressure of at least about 40 p.s.i.

3. The process of claim 1 wherein said metal catalyst is palladium.

4. The process of claim 1 wherein said metal catalyst is nickel.

5. The process of claim 1 wherein said metal catalyst is platinum.

6. A process for the preparation of trimethylhydrazine which consists essentially of reacting methylenedimethylhydrazine with hydrogen at a pressure within the range of about 40 to 4000 p.s.i. and at a temperature between about 0° and 100° C. in the presence of a palladium catalyst, and recovering trimethylhydrazine from the resulting reaction product mixture.

References Cited by the Examiner
UNITED STATES PATENTS 2,830,050  4/58  Biel _____ 260—583

OTHER REFERENCES

Class et al.: Journal American Chemical Society, vol. 73, page 2359 (1951).

Klages et al.: "Annalen Der Chemie," vol. 547, page 8, 1941.

CHARLES B. PARKER, *Primary Examiner.*

IRVING MARCUS, LEON ZITVER, *Examiners.*